United States Patent [19]

Cooper et al.

[11] Patent Number: 4,509,549
[45] Date of Patent: Apr. 9, 1985

[54] HYDRAULIC POWERED GATE VALVE

[75] Inventors: Merton G. Cooper; William R. Kerns, both of Port Orchard; Daniel E. Filley, Bremerton, all of Wash.; Gary A. Koschnick, San Diego, Calif.

[73] Assignee: The United States of America as represented by the Secretary of the Navy, Washington, D.C.

[21] Appl. No.: 433,747

[22] Filed: Oct. 12, 1982

[51] Int. Cl.³ .............................................. F16K 3/30
[52] U.S. Cl. .................................... 137/327; 137/550; 137/599.2; 137/605; 251/62; 251/282; 251/327; 251/329
[58] Field of Search ................. 251/62, 282, 327, 329; 137/327, 550, 599.2, 605

[56] References Cited

U.S. PATENT DOCUMENTS

| 25,094 | 8/1859 | Clear | 251/327 |
|---|---|---|---|
| 27,789 | 10/1873 | Tillman | 251/327 |
| 1,171,116 | 2/1916 | Haeseler | 137/550 |
| 1,442,204 | 1/1923 | Wilson . | |
| 1,683,625 | 9/1928 | Nickerson . | |
| 2,109,042 | 2/1938 | Bennett et al. | 251/167 |
| 2,131,053 | 9/1938 | Kinzie et al. | 251/51 |
| 2,351,775 | 6/1944 | McMurry | 137/599.2 |
| 2,632,461 | 3/1953 | Lindsay | 137/605 X |
| 3,047,266 | 7/1962 | Ver Nooy | 251/329 X |
| 3,109,624 | 11/1963 | Edwarde | 251/329 |
| 3,226,078 | 12/1965 | Anderson | 251/62 |
| 3,575,380 | 4/1971 | Siver | 251/329 X |
| 3,695,578 | 10/1972 | Walther et al. | 251/94 |
| 3,765,647 | 10/1973 | Grove et al. | 251/317 |
| 3,889,925 | 6/1975 | Brooks | 251/327 |
| 4,112,969 | 9/1978 | Still | 251/329 X |

FOREIGN PATENT DOCUMENTS 917440 2/1963 United Kingdom .............. 251/329

Primary Examiner—Robert G. Nilson
Attorney, Agent, or Firm—R. F. Beers; C. D. B. Curry; W. C. Daubenspeck

[57] ABSTRACT

A hydraulically actuated fast action gate valve for gating highly viscous fluids in a salt water environment includes front and back plates having openings for connection to conduits containing the viscous fluid and a center plate having a slot for receiving a slidable gate that includes an optional check valve. A gate is positioned within the slot and includes upper and lower grooves that provide rapid equalization of pressure of the viscous fluid between the opposite ends of the gate when the gate is rapidly actuated. One end of the gate is connected by a locking pin to an actuating rod that is driven by a hydraulic cylinder that is mounted external to the valve. The front and back plates have opposing passages allowing the actuating rod to be secured to the gate so that the hydraulic cylinder may be removed. An optional opening is provided in the back plate to permit the introduction of a non-gated fluid into piping contained within the inlet conduit.

6 Claims, 10 Drawing Figures

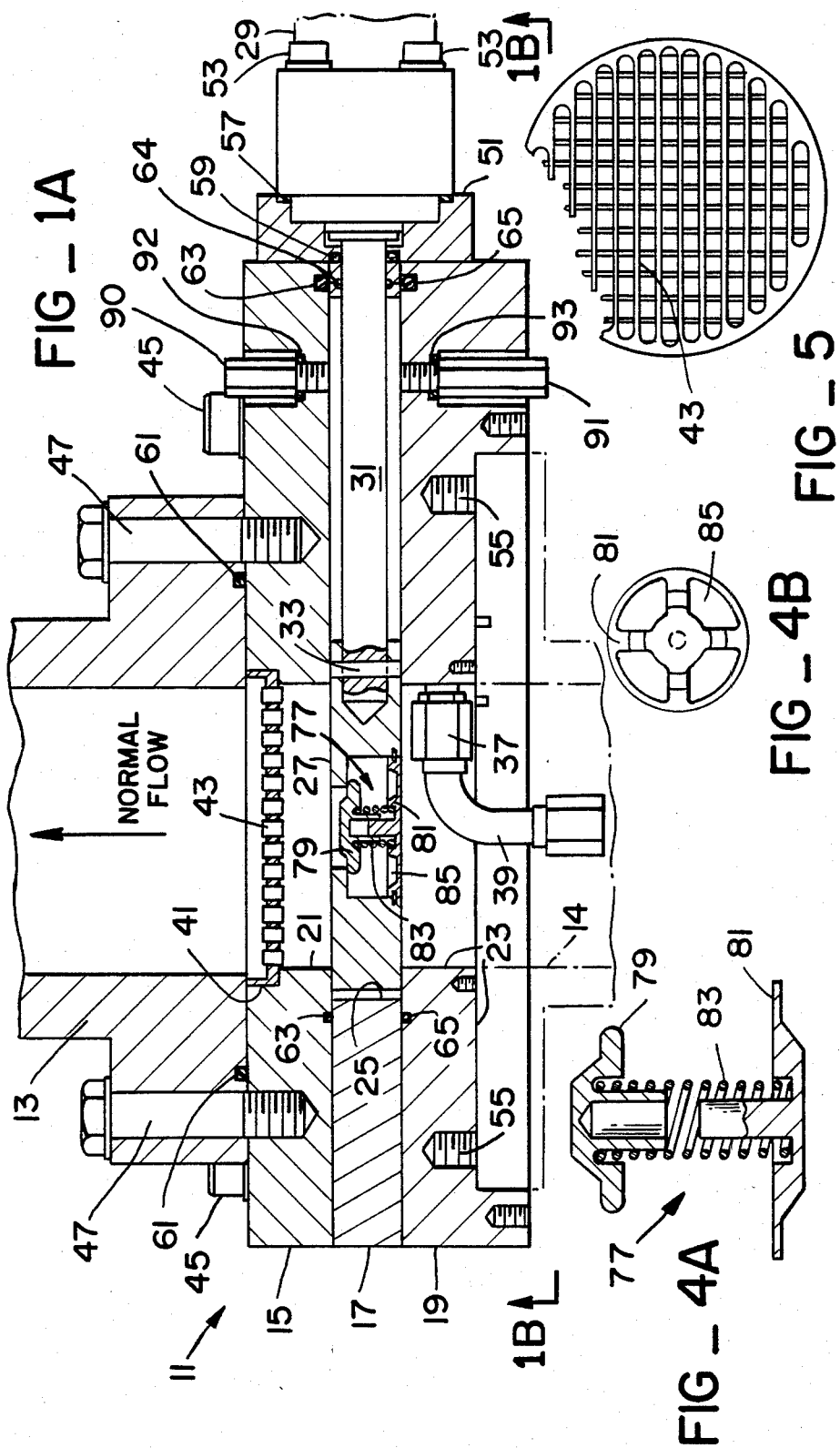

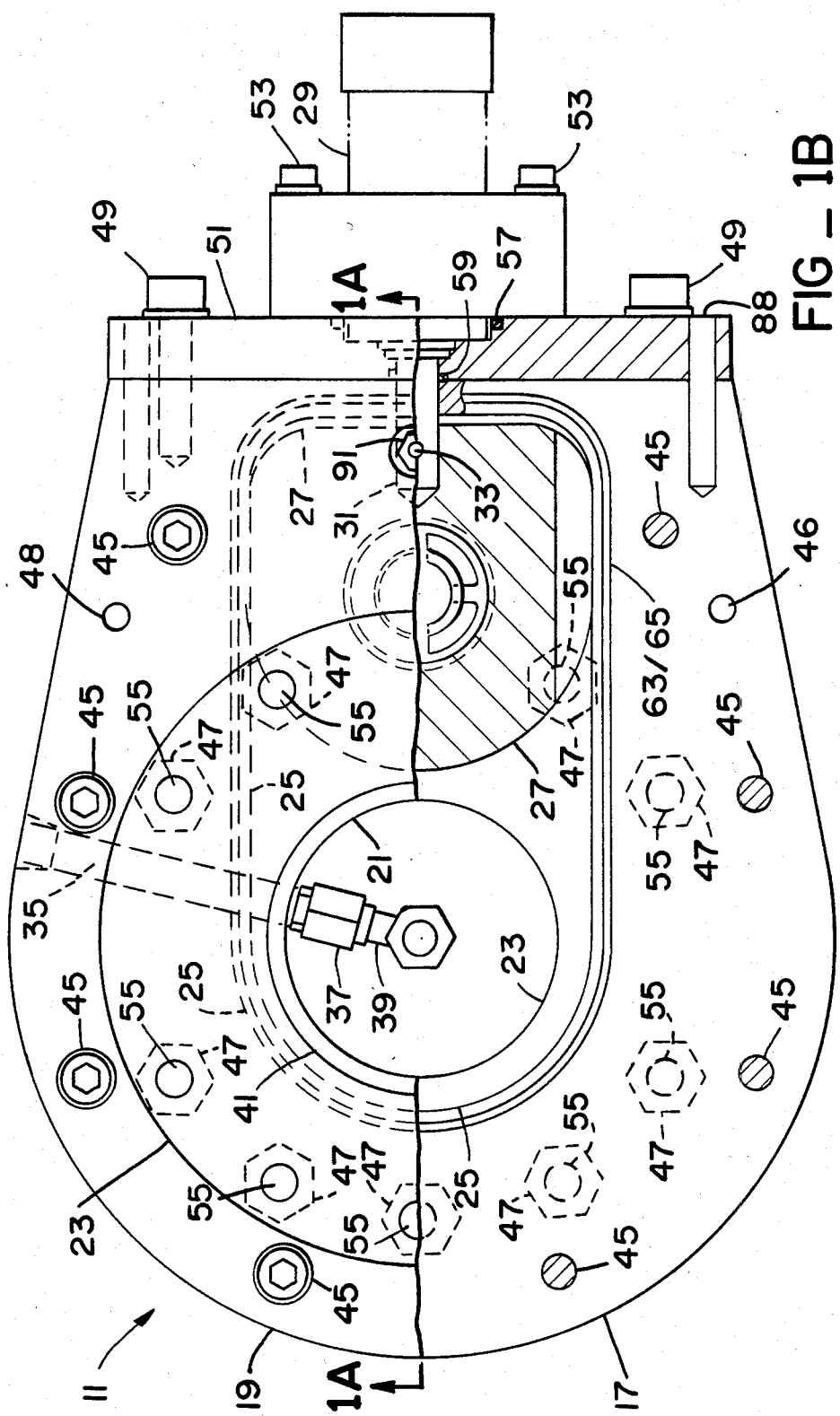
FIG_1B

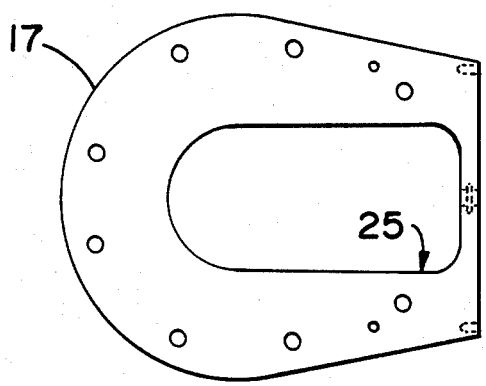
FIG_2
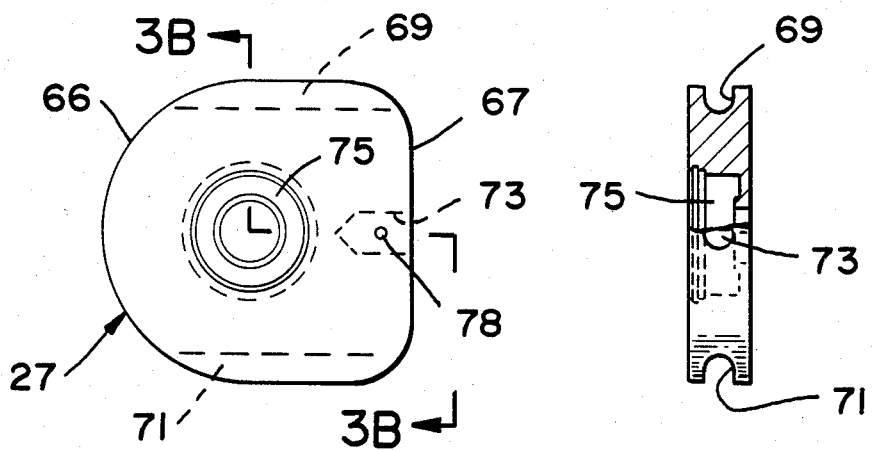
FIG_3A  FIG_3B
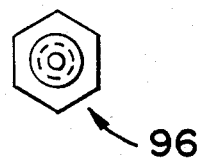
FIG_6A
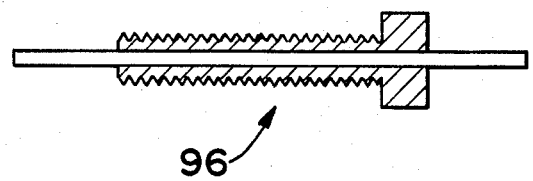
FIG_6B

4,509,549

HYDRAULIC POWERED GATE VALVE

BACKGROUND OF THE INVENTION

1. Field of the Invention

The present invention relates to a hydraulic powered gate valve and more particularly to a hydraulic powered gate valve that rapidly gates highly viscous fluids and is effective in a salt water environment.

2. Description of Prior Art

The rapid gating of highly viscous fluids by a valve submerged in a salt water environment is a relatively new Naval requirement. Various types of prior art valves have been used in an attempt to meet this requirement but without success. Wedge valves resulted in sticking and did not permit rapid action, especially when used to gate highly viscous fluids. Screw type valves proved to be too complex and slow acting. Both types of valves were generally not suitable for long term operation when submerged in a salt water environment.

The present invention overcomes these problems by providing a hydraulic powered gate valve that is rapid acting when gating highly viscous fluids and is effective in a salt water environment.

SUMMARY OF THE INVENTION

Briefly, the present invention comprises a hydraulically actuated fast action gate valve that is particularly suitable for gating highly viscous fluids in a salt water environment. The gate valve includes a front plate, center plate and back plate. The front and back plates respectively have openings for connection to outlet and inlet conduits containing the viscous fluid. The center plate, having a slot for receiving a slidable gate that includes an optional check valve, is positioned between the front and back plates. A gate is positioned within the slot and includes upper and lower grooves that extend the length of the gate. One end of the gate is connected to an actuating rod that is driven by a hydraulic cylinder that is mounted external to the valve. The slot width and center plate thickness is selected to be greater than the gate so that it may slide freely. The gate is streamlined and is made thin to facilitate rapid gate action. The grooves in the gate are selected to be of sufficient size to permit rapid transfer of viscous fluid and thereby provide equalization of pressure of the viscous fluid between the opposite ends of the gate when the gate is rapidly actuated. Sealing is accomplished by using ground surfaces on the flat faces of the gate and on the front and back plates. The gate is free floating within the slot and when the gate is closed, fluid pressure provides added sealing force on the gate and front or back sealing surfaces. An optional opening is provided in the backplate to vent air or provide samples or permit the introduction of non-gated fluid into piping contained within the inlet conduit. Various seals are critically placed to prevent ambient salt water from entering the valve or mixing with the viscous fluid.

STATEMENT OF THE OBJECTS OF THE INVENTION

An object of the present invention is to provide an effective hydraulic powered gate valve.

Another object of the present invention is to provide a gate valve that is effective for gating highly viscous fluids.

Still another object of the present invention is to provide a gate valve that is rapid acting when gating highly viscous fluids.

A further object of the present invention is to provide a fast acting gate valve that is easy to manufacture and repair.

A still further object of the present invention is to provide a gate valve that is effective for long term use when submerged in salt water.

An additional object of the present invention is to provide valve that effectively segregates the fluid, sea water and hydraulic oil from each other.

Other objects, advantages and novel features of the invention when considered in conjunction with the accompanying drawings wherein:

BRIEF DESCRIPTION OF THE DRAWINGS

FIG. 1A is a side section view of the hydraulic powered gate valve of the present invention;

FIG. 1B is a rear elevation view of the hydraulic powered gate valve of the present invention taken at section 1B—1B of FIG. 1A;

FIG. 2 is a rear elevation of the center plate of FIGS. 1A and 1B;

FIG. 3A is a rear elevation of the slidable gate shown in FIGS. 1A and 1B;

FIG. 3B is an end view of the slidable gate taken at section 3B—3B of FIG. 3A;

FIG. 4A is a side assembly view, partly in section, of the optional check valve used in the gate of FIGS. 1A, 1B, 3A and 3B;

FIG. 4B is an end view of the optional check valve of FIG. 4A;

FIG. 5 is a front view of the optional strainer shown in FIG. 1A; and

FIGS. 6A and 6B show an insertion tool for removing the hydraulic cylinder without dismantling the valve.

DESCRIPTION OF THE PREFERRED EMBODIMENT

The hydraulic powered gate valve 11 of the present invention is shown in FIGS. 1A and 1B. This gate valve is particularly suitable for gating highly viscous fluids contained in inlet conduit 14 and discharged through outlet conduit 13. The sealing of the valve is equally effective in either direction and the flow could be reversed if check valve is deleted. The valve includes front plate 15, center plate 17 and back plate 19. The front plate 15 includes an opening 21 that communicates with outlet conduit 13. The back plate 19 includes an opening 23 that communicates with inlet conduit 14. As best shown in FIGS. 1B and 2, center plate 17 includes slot 25 that receives slidable gate 27. The details of gate 27 are shown in FIGS. 3A and 3B. The gate 27 is shown in the closed position of FIG. 1A and in the open position in FIG. 1B.

Mounted on the exterior of the valve is a modified hydraulic device 29 that operates an actuating rod 31 in a manner well known to those skilled in the art. The external end of rod 31 is connected to gate 27 by pin 33. The hydraulic cylinder of device 29 is manufactured using non magnetic materials. The piston in the cylinder is modified by inserting a magnetic disc. The disc actuates reed type switches mounted outside the cylinder which indicate the position of the piston and therefore the sliding gate.

As shown in FIG. 1B, back plate 19 includes an opening 35 that extends from the external surface to the internal surface of opening 23. As shown in FIGS. 1A and 1B, a threaded fitting 37 communicates with opening 35 and has a right angle elbow 39 that has its outlet aligned with the center of opening 23. Through this opening 35, a second fluid may be introduced into the valve and conveyed within inlet conduit 14 or a sample can be withdrawn or air vented from the valve. Front plate 15 includes a recessed cavity 41 for receiving an optional strainer plate 43.

A plurality of bolts 45 in conjunction with alignment dowels 46 and 48 are used to hold the front, back and center plates in fixed relationship. Bolts 47 attach outlet conduit 13 to front plate 15 and bolts 49 attach block 51 to the valve body. Hydraulic device 29 is attached to block 51 by bolts 53. A plurality of threaded openings 55 are provided to attach inlet conduit 14 to back plate 19.

As shown in FIG. 1A, a seal 57 is provided to prevent sea water leakage between block 51 and hydraulic device 29. Seal 59 is provided to prevent sea water leakage into valve slot 25. Seal 61 prevents sea water leakage between conduit 13 and front plate 15 and seals 63 and 65 prevent leakage between the front plate and the center plate 17 and the back plate 19 and the center plate, respectively. Seals 63 and 65 have the same configuration, as best shown in FIG. 1B. Seal 64 prevents leakage around shaft 31. The various seals are preferably of the O-ring type.

The slidable gate 27 is generally shown in FIGS. 1A and 1B and the details thereof are shown in FIGS. 3A, 3B. Referring to these figures, the slidable gate 27 is rounded at its forward surface 66 and is flat at its rearward surface 67. The rounded forward surface 66 provides a streamlining effect and reduced drag when the valve is rapidly closed against a highly viscous fluid. Gate 27 has a large groove 69 extending the length of the upper surface and a large groove 71 extending the length of the lower surface. These grooves equalize the pressure on both ends of the gate by preventing pressure build up at the front and rear of the gate during rapid opening and preventing the creation of a vacuum at the rear of the gate during rapid closing.

Gate 27 has an opening 73 for receiving actuating rod 31. A hole 78 intersects opening 73. Pin 33 is inserted into hole 78 for securing rod 31. The opening 73 is oversize relative to the actuating rod 31 so that a loose fit is obtained. The oversized hole 73 and the pin connection allow the gate 27 to float in the slot 25 so that the gate may sit flat against either the front plate 15 or back plate 19 for the best seal. If the gate 27 were fixed rigidly to the rod 31, it would be impossible to seal the valve and the gate 27 or hydraulic device 29 could be jammed.

The stroke of the hydraulic cylinder 29 is limited by using an internal stop tube (not shown). This is important because the cylinder 29 stops in both open and closed position with clearance on both the top and bottom of the gate 27 within the center slot 25. This clearance is necessary because the force of the cylinder could shear the pin 33 retaining the gate 27 to the rod 31. Normally the load on the pin 33 is only the drag caused by the friction of moving the gate 27. Low drag on the gate 27 permits air to be substituted for hydraulic power. The amount of force required to move the gate 27 is dependent upon the pressure pushing upon the gate when closed. A teflon coating may be applied to the gate 27 to resist corrosion and galling of the sealing surfaces and to reduce friction.

Gate 27 also has an opening 75 for retaining check valve 77. As best shown in FIGS. 4A and 4B the optional check valve 77 includes a valve section 79, a retainer section 81 and a spring 83. The retainer section 81 has a plurality of openings 85 that permit fluid flow. When the gate is closed and the differential pressure exceeds a predetermined amount, the valve section 79 compresses the spring 83 and the check valve 77 opens to permit the flow of the viscous fluid through gate 27.

A special feature which permits the hydraulic cylinder 29 to be removed without removing or dismantling the valve 11 is provided by the plugs 90 and 91 shown in FIGS. 1A and 1B. Removing both plugs permits insertion of tool 96 shown in FIGS. 6A and 6B. Tool 96 is screwed into front plate 15 or back plate 19 to lock gate 27. The tip of the tool displaces the locking pin 33 to lock the gate 27 in place. The pin 33 is pushed out the opposite side of the valve through the plug opening. Seals 92 and 93 prevent sea water from entering valve.

From the foregoing it can be seen that a highly effective gate valve is provided that rapidly gates highly viscous fluids and effectively prevents the entry of ambient sea water into the valve.

Obviously many modifications and variations of the present invention are possible in the light of the above teachings. It is therefore to be understood that within the scope of the appended claims the invention may be practiced otherwise than as specifically described.

What is claimed is:
1. A gate valve comprising:
(a) a front plate, a back plate and a center plate, said front plate having a first opening for receiving or discharging a highly viscous fluid, said back plate having a second opening in alignment with said first opening for receiving or discharging said highly viscous fluid, said center plate having a slot, said center plate being positioned between said front and back plates wherein one end of said slot is in alignment with said first and second openings and the other end forms a rearward gate cavity between said front and back plates;
(b) a flat gate positioned within said slot and having a forward section, a flat rearward secion, a length, a width, a height, a top, and a bottom, said width of said gate being less than the width of said center plate, said length being less than the length of said gate cavity, said height being less than the height of said slot and said forward section of said gate being curved to provide reduced drag when said gate is closed against highly viscous fluid, said one end of said slot being curved to receive said curved forward section of said gate and said other end of said slot being flat to receive said rearward section of said gate; and
(c) means for slidably actuating said gate, said actuating means including a hydraulic device mounted onto the exterior of said valve and inluding an actuating rod extending through an opening in said center plate and into said rearward gate cavity and operatively connected to said rearward section of said gate, said actuating rod being operatively connected to said gate by a locking pin extending through a passage through the width of the gate in the region of said cavity and an aperture in the actuator rod, said front plate and rear plate have opposing passages facing said actuating rod for disposing removable plugs, said passages allowing access to said locking pin, whereby said actuating rod may be held immovable by apparatus secured in one of said opposing passages, said apparatus being inserted into the passage in the actuating rod to displace said locking pin and secure said actuating rod to said gate.

2. The gate valve of claim 1 wherein:
(a) said gate has a width that is less than the width of said front plate and is loosely connected to said actuating rod.

3. The gate valve of claim 2 wherein:
(a) said gate includes a top groove that extends along the top of said gate between said forward and rearward sections of said gate;
(b) said gate includes a bottom groove that extends along the bottom of said gate between said forward and rearward sections of said gate; and
(c) said grooves having a predetermined size that permits rapid operation of said gate when used to gate a highly viscous fluid.

4. The gate valve of claim 3 wherein:
(a) said gate includes an opening:
(b) a check valve positioned within said opening;
(c) said check valve inluding a valve section, a retainer section and a spring; wherein
(d) when the differential pressure across said check valve exceeds a predetermined amount, the valve section opens against said spring to permit the transfer of said highly viscous fluid.

5. The gate valve of claim 4 wherein:
(a) said front plate includes a strainer plate positioned within said first opening.

6. The gate valve of claim 5 wherein:
(a) said rear plate includes a third opening extending from its outer surface to said second opening; and
(b) conduit means connected to said third opening and positioned within said second opening.

* * * * *